United States Patent Office 3,346,010
Patented Oct. 10, 1967

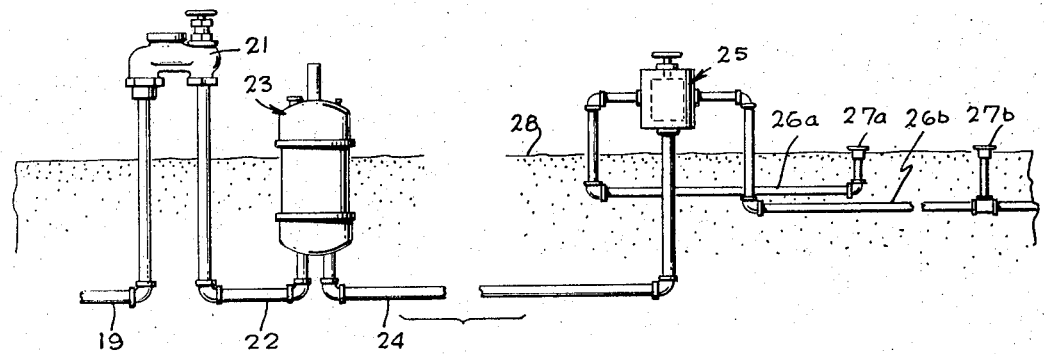
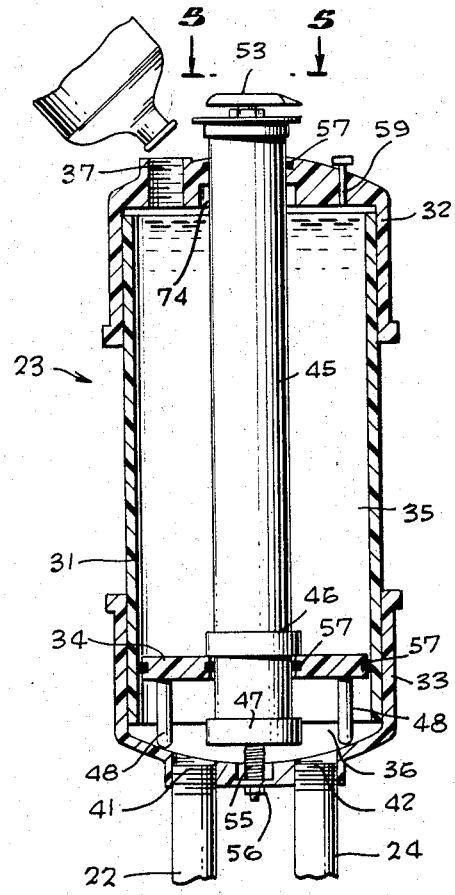
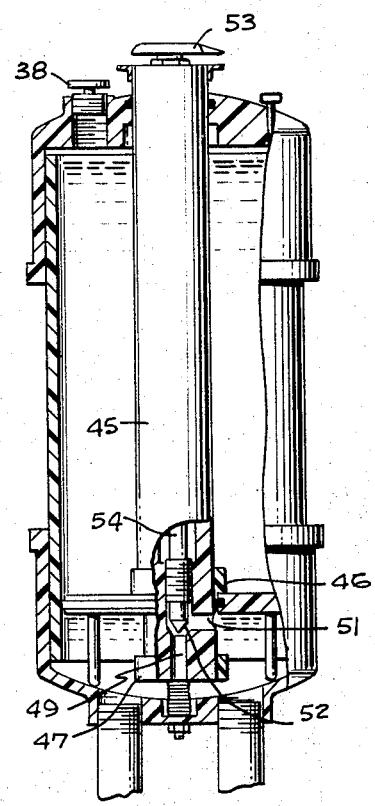

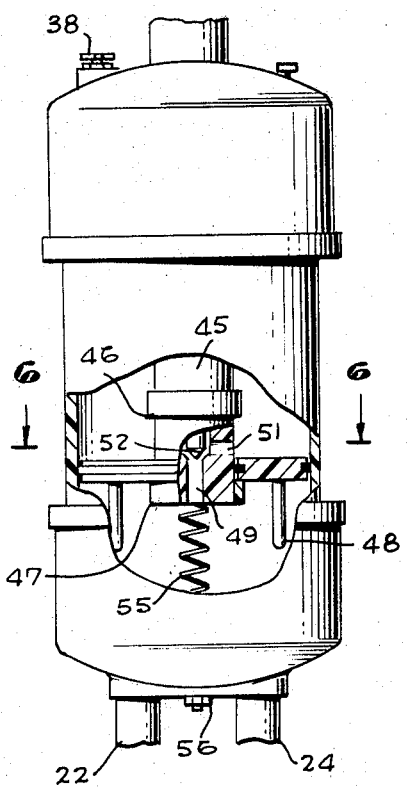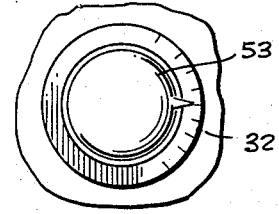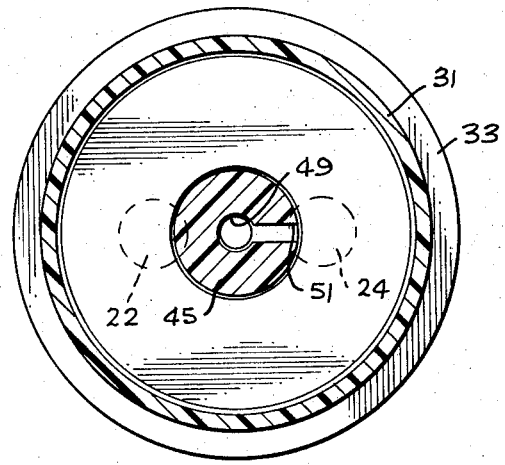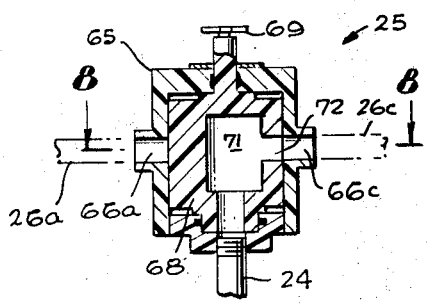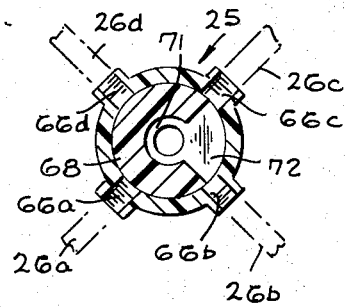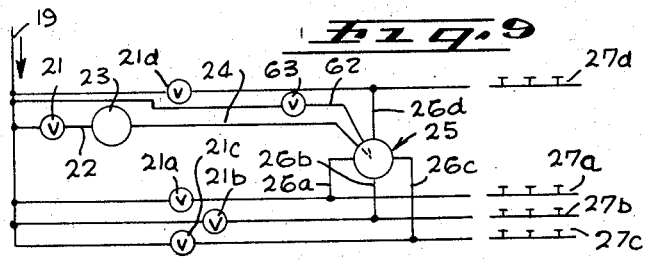

3,346,010
ANTISIPHON FLUID DISPENSING AND
DISTRIBUTING SYSTEM
Sanford S. Shapiro, 7009 Rival Road, Canoga Park,
Calif. 91304
Filed Aug. 20, 1965, Ser. No. 481,328
9 Claims. (Cl. 137—564.5)

ABSTRACT OF THE DISCLOSURE

An antisiphon fluid dispensing and distributing system employing a pressure-actuated piston to discharge fluid into a mixing chamber, an adjustable pressure-actuated slide valve reciprocating through said piston to regulate said discharge, and valve means for selectively maintaining said mixing chamber in continuous communication with at least one of a plurality of discharge ports.

---

The subject invention relates to antisiphon fluid dispensing and distributing systems. More particularly it concerns such systems adapted for the mixing of chemicals, such as fertilizer, soil conditioner, insecticide, weed killer or the like, with a continuous stream of water and the selective distribution of the resulting mixture or solution to one of several points of use, such as an array of lawn or garden sprinkler heads. Although as will be observed the subject invention is capable of many other uses, for the purpose of the following description it will be illustrated as it might be employed for lawn sprinkling or garden maintenance.

Spraying attachments for adding lawn maintenance or gardening chemicals to water from a household source have long been known. These fall typically into the category of aspirators, such as that depicted in United States Patent No. 2,072,124, and piston actuated devices, such as that shown in United States Patent No. 1,430,348. For permanent installations the later form is highly preferable over the former. These existing piston-type spraying attachments, however, are subject to a number of deficiencies, which must be overcome if they are to be of practical utility. A number, and by far the most serious of these deficiencies result from the fact that unless the chemical to be sprayed is completely exhausted in each use, any of it remaining after the water is shut off at its source will drain into the water line unless a special valve is provided and is closed by hand after each use. The requirement for the closing of this valve imposes a highly undesirable burden on the user of such devices, especially when there are a number of separate installations in operation; but the alternative, that is the accumulation of extremely high concentrations of dangerous chemicals in the water line is clearly a far more undesirable one.

A second source of potential danger arises from the use of existing valve mechanisms to shunt the flow of chemical containing water from one sprinkler line or spraying outlet to another. Unless a separate antisiphon valve is used with each sprinkler line or outlet, the possibility is always present that while the selector valve is closed excessive pressure will be built up in the mixing device and an excess of chemical forced into the line. It is, accordingly, a principal object of the subject invention to provide a system for dispensing and distributing fluids containing effective pressure relieving an antisiphon characteristics.

It is a further object of the subject invention to provide such a system permitting the mixing of fluids from different sources and the distribution of the resulting mixture or solution without the danger of contamination of either of the sources themselves.

Another object of this invention is the provision of a system of the described character in which the composition of the resulting mixture or solution can be accurately controlled. At the same time, it is another object to create a complete system to accomplish these and other desirable goals which is simple and durable of construction and requires a minimum of maintenance. Still other and further objects will become apparent as the invention is described in connection with the accompanying drawings, in which:

FIGURE 1 is a side elevational view taken partially above and partially below ground illustrating a preferred embodiment of the subject invention as it might be installed in a lawn or garden;

FIGURE 2 is a vertical sectional view taken through the dispenser of the subject invention;

FIGURE 3 is a vertical sectional view similar to that of FIGURE 2, but with portions of the dispenser cut away to show its internal structure;

FIGURE 4 is a side elevational view of the dispenser illustrated in FIGURES 2 and 3 with portions cut away to show the position of the internal structure of the dispenser while it is in operation;

FIGURE 5 is a top view of the valve handle of the dispenser shown in FIGURE 2 taken in the direction 5—5;

FIGURE 6 is a cross sectional view of the dispenser of the subject invention taken in the direction 6—6 of FIGURE 4;

FIGURE 7 is a vertical sectional view of the distributor of the subject invention;

FIGURE 8 is a cross sectional view of the distributor of FIGURE 7 taken in the direction 8—8; and FIGURE 9 is a diagram illustrating schematically the arrangement of the components of the subject invention in a typical installation.

Wherever possible the same numeral has been used in the several figures to represent the same component part.

In one preferred embodiment the system of the subject invention is attached to household water line 19 by means of antisiphon valve 21 and outside line 22. The invention itself comprises fluid dispenser 23, distributor line 24 and line selector valve 25, which is connected to a plurality of sprinkler lines, shown here by way of description at 26a and 26b, each of which has an array of sprinkler heads, shown here at numerals 27a and 27b, respectively. If desired, the entire system may be permanently installed substantially at or below ground level 28.

As depicted in FIGURES 2, 3 and 4, dispenser 23 of the invention is preferably in the form of a cylindrical body 31 having an upper end cap 32 and a lower end cap 33 forming a fluid tight enclosure. Piston 34 is positioned within the cylindrical body 31 and adapted to reciprocate therein.

Piston 34 effectively divides cylindrical body 31 into an upper fluid storage chamber 35 and a lower fluid mixing chamber 36. Opening 37 in upper end cap 32 is provided for filling fluid storage chamber 35 with any desired chemical. Cap 38 furnishes an air tight cover for opening 37.

As an alternative to this filling arrangement, opening 37 may be connected directly to a source of the desired chemical, thereby permitting extended unattended operation. For reasons which will become clear it would be desirable in such instances to provide opening 37 with a check valve (not shown) permitting the flow of chemical into storage chamber 35 but not in the reverse direction.

Lower end cap 33 contains intake port 41 and discharge port 42 which are adapted to be connected with outside line 22 and distributor line 24, respectively.

Openings are formed in the centers of upper end cap 32 and piston 34, and plunger 45 is adapted to fit through these openings and reciprocate freely in slideable contact with them.

Two annular collars 46 and 47 are formed near the lower end of plunger 45 and limit the travel of the plunger 45 through piston 34.

Stops 48 may be attached to piston 34 or lower end cap 33 to insure that the lower end of plunger 45 cannot come in contact with the bottom of the dispenser 23. For illustrative purposes only stops 48 are shown here connected to the underside of piston 34.

A fluid passage 49 is formed in the lower end of plunger 45. The upper end of this passage terminates at port 51 in the side of plunger 45. The location of port 51 is of critical importance to the subject invention. As will be seen clearly in FIGURES 3 and 4, when plunger 45 is at the lower limit of its travel through piston 34 and collar 46 is resting on piston 34, port 51 lies below piston 34. When plunger 45 is at or near the uppermost limit of its travel through piston 34 port 51 lies above piston 34, and passage 49 is in communication with fluid storage chamber 35.

Valve means, such as needle valve 52, may be provided in fluid passage 49 to control the flow of fluid through the passage. Valve handle 53, acting through rod 54 to actuate needle valve 52, may be provided with a calibrated indicator card, as shown in FIGURE 5, to enable the user to adjust and set the valve for any desired mixing ratio.

Tension spring 55 with spring adjustment means 56 are attached to the lower end of plunger 45. Where dispenser 23 is positioned below the ground level, spring adjustment means 56 may be provided with appropriate linkages so that it may be operated from above the surface.

Seals 57 in upper end cap 32 and piston 34 insure that fluid storage chamber 35 and fluid mixing chamber 36 remain fluid tight at all times. Check valve 59 in upper end cap 32 permits air to enter storage chamber 35 when the pressure within chamber 35 is reduced, but prevents the flow of fluid or air in the opposite direction when pressure within the chamber is greater than atmospheric pressure.

The embodiment of the distributor of the subject invention illustrated in FIGURES 7 and 8 is formed of a casing 65 having a number of discharge ports 66a, 66b, 66c, 66d, located around its cylindrical circumference. These ports are adapted to be connected to sprinkler lines 26a, 26b, 26c, and 26d, respectively. Enclosed within casing 65 and adapted for rotation around the longitudinal axis thereof is valve body 68. Distributor line 24 leading from fluid dispenser 23 is connected to the bottom of casing 65. Plenum chamber 71 within valve body 68 is in constant communication with distributor line 24.

Plenum chamber 71 opens to one side into an enlarged discharge cavity 72, the mouth of which is adapted to register with discharge ports 66a, 66b, 66c, 66d, in the casing 65 when valve body 68 is rotated by means of selector handle 69. It is critical to the subject invention that the width of the mouth of discharge cavity 72 must be greater than the distance between any two adjacent discharge ports. That is, discharge cavity 72 is constructed so that it is at all times in communication with at least one discharge port with its associated sprinkler line.

In operation, cap 38 is removed and fluid storage chamber 35 is filled with a concentrated solution of the chemical to be applied to the lawn or garden. Under the influence of spring 55 piston 34 has been drawn to its lowest position. Cap 38 is replaced and valve handle 53 adjusted for the desired rate of flow or concentration of chemical. Selector handle 69 on distributor 25 is set to water the desired section of lawn or garden. Antisiphon valve 21 is then opened.

Water from the household water line 19 flows through antisiphon valve 21 and outside line 22 into fluid mixing chamber 36 and thence through distributor line 24 and line selector valve 25 to the previously selected sprinkler line, for example line 26a. Fluid pressure builds up very quickly throughout the system.

Since the upper end of plunger 45 extends through upper end cap 32 and is acted upon only by atmospheric pressure, when the force exerted on plunger 45 by the water in mixing chamber 36 exceeds the force exerted on it by the atmosphere plunger 45 is driven upwardly through piston 34. The restraining force of spring 55 is relatively insignificant, being only sufficient to pull plunger 45 and piston 34 into their respective rest positions when the flow of water into mixing chamber 36 is stopped, and is easily overcome by the pressure in chamber 36 while the water is flowing.

While plunger 45 is in its lowest position, with upper collar 46 in contact with the upper surface of piston 34, port 51 is below piston 34 and there is no communication between storage chamber 35 and mixing chamber 36. When plunger 45 is raised by water pressure in mixing chamber 36 its upward motion through piston 34 is halted when lower collar 47 comes to rest against the lower surface of piston 34. At this point port 51 lies above piston 34, and storage chamber 35 is in fluid communication with mixing chamber 36 through passage 49. The chemical contents of storage chamber 35 are now free to flow through passage 49 into mixing chamber 36, at a rate controlled essentially by the orifice opening of needle valve 52 and the fluid pressure differential between storage chamber 35 and mixing chamber 36.

As illustrated in FIGURE 4, as plunger 45 continues to rise under the influence of fluid pressure in mixing chamber 36, lower collar 47, bearing on piston 34, carries the piston upwardly with the plunger. The force exerted upwardly on the piston 34 is essentially the difference between the force exerted by the fluid in mixing chamber 36 on the lower end of plunger 45 and the force exerted by the atmosphere on the upper end of the plunger. While this upwardly directed resultant force effectively holds fluid passage 49 open, with cap 38 and check valve 59 closed it also increases the pressure differential between storage chamber 35 and mixing chamber 36 and thus, for all practical purposes, insures a uniform rate of flow of chemical from storage chamber 35 to mixing chamber 36 with any given setting of needle valve 52.

With the water pressure set at a constant level by means of antisiphon valve 21 and needle valve 52 adjusted for the desired rate of flow of chemical continuous fully automatic mixing of precisely the proper concentration of chemical solution in mixing chamber 36 is assured.

An annular recess 74 may be provided in the under side of upper end cap 32 to receive upper collar 46 as piston 34 reaches the upper end of cylindrical body 31. By making recess 74 sufficiently deep to provide clearance for port 51 when the upper surface of piston 34 is in contact with the lower surface of upper end cap 32, dispenser 23 can be adapted to utilize virtually all of the chemical contained in storage chamber 35.

In previous forms of piston type dispensers, if the flow of water was stopped the stored chemical continued to flow into the mixing chamber until its supply was exhausted or a valve was closed in the duct connecting the storage chamber and the mixing chamber. The result, of course, was to fill the lines leading from the household water source and to the sprinklers with a dangerously high concentration of chemical. This condition created a very real threat of contamination of the household water source or over exposure of the lawn or garden or both. The subject invention obviates these threats.

Immediately upon the closing of antisiphon valve 21, or the cessation of flow of water through the mixing chamber 36 for any reason, as will be seen the pressure on the underside of plunger 45 and piston 34 is dissipated. In the absence of the upwardly directed force acting on plunger 45, spring 55 quickly pulls plunger 45 downwardly through piston 34 until its downward motion is arrested by collar 46. In this position port 51 is below piston 34, and storage chamber 35 is once again effectively sealed off from mixing chamber 36. Under the urging of spring 55, plunger 45 and piston 34 continue to be drawn downwardly until their motion is halted by stops 48. During the downward motion of plunger 45 and piston 34 check valve 59 opens automatically to allow air to enter storage cavity 35, thereby avoiding the creation of a partial vacuum, which might otherwise impede the withdrawal of the plunger and piston.

It should be noted that spring 55 is only one of a number of alternative means which may be employed to accomplish the prompt closing of passage 49 when pressure is lost in mixing chamber 36. For example plunger 45 may be constructed so as to drop quickly under its own weight, or passage 49 may be provided with a valve adapted to remain open only while water is flowing through chamber 36.

Water flowing through antisiphon valve 21 and mixed with chemical in dispenser 23 enters distributor 25 through distributor line 24, and passes directly into plenum chamber 71 under pressure. If line selector valve 25 were of conventional design, capable of being fully closed either intentionally or through inadvertence, a hazard would exist whenever antisiphon valve 21 was opened. Even with the fluid dispenser 23 of the subject invention, pressure in the system acting on plunger 45 and piston 34 would force excessive amounts of the chemical from chamber 35 into chamber 36 and thence line 22, from which it could easily contaminate household line 19. For this reason good practice, and in many communities the building and safety laws, expressly prohibit the placement of any closeable valve in a line connected to a household water source downstream of an antisiphon valve. This hazard is completely eliminated by the line selector valve 25 of the subject invention.

The new and novel construction of discharge cavity 72 insures that there can be no build up of excess pressure in the system downstream of antisiphon valve 21, even while selector handle 69 is being rotated to direct the flow of chemical containing water from one sprinkler line to another.

FIGURE 9 illustrates one of a number of possible arrangements incorporating the subject invention in a lawn sprinkling system. It should be noted that this particular arrangement is far more complex than it need be; however, it has been chosen in order to point out some of the advantages attendant with the use of the subject invention.

Commonly, in a home having lawns at the front and rear and both sides, watering is accomplished by means of four separate sets of sprinklers, here designated by numerals 27a, 27b, 27c and 27d. Each of these sprinkler sets is connected to household line 19 through an antisiphon valve, here designated by numerals 21a, 21b, 21c and 21d, respectively. These valves are necessary in order to prevent the possible pollution of water in the household line by seepage from the sprinkler lines.

If desired, the need for at least three of these antisiphon valves could be eliminated by connecting household line 19 through a single antisiphon valve 63 and selector line 62 to the line selector valve 25 of the subject invention. Since, as stated earlier, this arrangement prevents the creation of back pressure in line 62, the danger of pollution of line 19 is completely eliminated.

The same result and saving in expense of additional antisiphon valves and individual sprinkler lines may be achieved through the use of the entire system of the subject invention, that is, by connecting fluid dispenser 23, distributor line 24 and line selector valve 25 directly to the household line 19 through outside line 22 and antisiphon valve 21. If it is desired to water the lawns without adding any chemical, this may be done either by leaving storage chamber 35 empty, or if it contains chemical, by closing needle valve 52. While this description clearly demonstrates the savings both in initial installation costs and expenses for maintenance and operation which may be achieved by use of the subject invention in a relatively simple household situation, it is obvious that these savings will be greatly multiplied when the subject invention is employed in a complex commercial installation, such as a golf course or farm.

Bearing in mind that the foregoing description and illustrations are offered only as examples of some of the typical applications of the subject invention and not as limitations on the scope of the invention itself, what is claimed is:

1. An antisiphon fluid dispensing and distributing system comprising:
   (A) a fluid dispenser including
       a storage chamber, a mixing chamber, and a passage communicating between them;
       intake and discharge ports in said mixing chamber, said intake port being connectable to a source of fluid under pressure; and
       adjustable means responsive to pressure in said mixing chamber adapted to provide a selectively variable opening in said passage when fluid is flowing through said mixing chamber and to close said passage when the flow of fluid is interrupted; and
   (B) a selector valve connected to the discharge port of said dispenser including
       a plurality of discharge ports; and
       means for selectively connecting the discharge port of said dispenser with said discharge ports, said means being adapted to be in continuous communication with at least one of said plurality of discharge ports.

2. The system described in claim 1 in which said selector valve comprises:
   a casing having said plurality of discharge ports spaced around its periphery; and
   a valve body adapted to be rotated within said casing and having a discharge cavity therein,
       said discharge cavity being in communication with the discharge port of said dispenser and having a mouth adapted to register with the discharge ports in said casing when the valve body is rotated, said mouth being wider than the distance between any adjacent pair of said plurality of discharge ports.

3. The system described in claim 1 in which said fluid dispenser comprises:
   a fluid tight container having an opening in its upper end;
   a piston adapted to reciprocate freely in said container and having an opening therethrough,
       said piston effectively dividing said container into said fluid tight storage chamber and said mixing chamber;
   an elongated plunger projecting through the opening in said container and adapted to reciprocate freely through said opening and the opening in said piston in response to fluid pressure within said mixing chamber;
   means associated with said plunger limiting its travel through said piston between an upper and a lower position;
   a passage in said plunger adapted to communicate between said storage chamber and said mixing chamber only when the plunger is in its said upper position;
   means associated with said plunger for selectively varying the effective size of said passage; and
   means adapted to return said plunger to its said lower position when the flow of fluid into the said mixing chamber is interrupted.

4. An antisiphon fluid dispensing and distributing system comprising:

(A) a fluid dispenser including
  a fluid tight container having an opening in its upper end;
  a piston adapted to reciprocate in said container and having an opening therethrough, said piston dividing said container into a fluid tight storage chamber and a mixing chamber;
  intake and discharge ports in said mixing chamber, said intake port being connectable to a source of fluid under pressure;
  an elongated plunger projecting through the opening in said container and adapted to reciprocate freely through said opening and the opening in said piston in response of fluid pressure within said mixing chamber;
  means associated with said plunger limiting its travel through said piston between an upper and lower position;
  a passage in said plunger adapted to communicate between said storage chamber and said mixing chamber only when the plunger is in its said upper position; and
  means adapted to return said plunger to its said lower position when the flow of fluid into said mixing chamber is interrupted;
(B) a selector valve connected to the discharge port of said dispensed including
  a casing having a plurality of discharge ports spaced around its periphery;
  a valve body adapted to be rotated within said casing and having a discharge cavity therein,
  said discharge cavity being in communication with the discharge port of said dispenser and having a mouth adapted to register with the discharge ports in said casing when the valve body is rotated, said mouth being wider than the distance between any adjacent pair of said plurality of discharge ports.

5. An antisiphon fluid dispensing and distributing system comprising:
(A) a fluid dispenser including
  a closed fluid tight cylinder, having an opening through its upper end;
  a piston adapted for free reciprocating motion within said cylinder, said piston effectively dividing said cylinder into an upper storage chamber and a lower mixing chamber, and having an opening therethrough;
  fluid intake and discharge ports in said mixing chamber, said intake port communicating through adjustable valve means with a source of fluid under pressure;
  an elongated plunger adapted for free reciprocating motion within said cylinder, said plunger extending slidably through said openings in the upper end of said cylinder and said piston, and being in fluid tight relationship with said openings;
  means associated with said plunger limiting the travel of said plunger through said piston between spaced upper and lower positions;
  a fluid passage in said plunger, said passage being adapted to communicate between said storage chamber and said mixing chamber when the plunger is in its said upper position but now when the plunger is in its said lower position, and being provided with adjustable valve means for controlling the rate of flow of fluid from storage chamber to the mixing chamber;
  resilient means continuously urging said plunger toward its said lower position;
  check valve means for admitting air into said storage chamber when the pressure therein falls below atmospheric pressure; and
  stop means adapted to halt the downward motion of said piston before the lower end of said plunger comes in contact with the bottom of said cylinder; and
(B) a selector valve including
  a fluid tight cylindrical casing, said casing being provided at spaced intervals around its circumference with a plurality of discharge ports, and having an intake port in communication with the discharge port of said fluid dispenser;
  a valve body adapted for rotation within said casing having a plenum chamber therein in communication with the intake port in said casing, and having a discharge cavity adapted to be in continuous fluid tight communication with at least one of the discharge ports in said casing; and
  position selecting means associated with said casing adapted to rotate said valve body selectively to bring said discharge cavity into communication with said discharge ports.

6. An antisiphon fluid dispensing and distributing system comprising:
(A) a fluid dispenser including
  a closed fluid tight cylinder, having an opening through its upper end;
  a piston adapted for free reciprocating motion within said cylinder, said piston effectively dividing said cylinder into an upper storage chamber and a lower mixing chamber, and having an opening therethrough;
  fluid intake and discharge ports in said mixing chamber, said intake port communicating through adjustable valve means with a source of fluid under pressure;
  an elongated plunger adapted for free reciprocating motion within said cylinder, said plunger extending slidably through said openings in the upper end of said cylinder and said piston, and being in fluid tight relationship with said openings;
  means associated with said plunger limiting the travel of said plunger through said piston between spaced upper and lower positions;
  a fluid passage in said plunger, said passage originating at its upper and at a first port, through the side of said plunger intermediate said travel limiting means and terminating at its lower end in a second port through the lower end of said plunger, said first port being positioned to be above said piston when the plunger is in its said upper position and below said piston when the plunger is in its said lower position, and being provided with adjustable valve means for controlling the rate of flow of fluid from the storage chamber to the mixing chamber;
  resilient means continuously urging said plunger toward its said lower position;
  check valve means for admitting air into said storage chamber when the pressure therein falls below atmospheric pressure; and,
  stop means adapted to halt the downward motion of said piston before the lower end of said plunger comes in contact with the bottom of said cylinder; and
(B) a selector valve including
  a fluid tight cylindrical casing, said casing being provided at spaced intervals around its circumference with a plurality of discharge ports, and having an intake port in communication with the discharge port of said fluid dispenser;
  a valve body adapted for rotation within said casing having a plenum chamber therein in communication with the intake port in said casing, and having a discharge cavity adapted to communicate with the discharge ports in said casing through an enlarged mouth, said mouth being wider than the distance between any adjacent pair of said discharge ports; and, position selecting means associated with said casing adapted to rotate said valve body selectively to bring said discharge cavity into communication with said discharge ports.

7. A fluid tight dispenser comprising:

a fluid tight container having an opening in its upper end;

a piston adapted to reciprocate freely in said container and having an opening therethrough, said piston dividing said container into a fluid tight storage chamber and a mixing chamber;

intake and discharge ports in said mixing chamber, said intake portion being connectable to a source of fluid under pressure;

an elongated plunger projecting through the opening in said container and adapted to reciprocate freely through said opening and the opening in said piston in response to fluid pressure within said mixing chamber;

means associated with said plunger limiting its travel through said piston between an upper and a lower position;

a passage in said plunger adapted to communicate between said storage chamber and said mixing chamber only when the plunger is in its said upper position; and means adapted to return said plunger to its said lower position when the flow of fluid into said mixing chamber is interrupted.

8. A fluid dispenser comprising:

a closed fluid tight cylinder, having an opening through its upper end;

a piston adapted for free reciprocating motion within said cylinder, said piston effectively dividing said cylinder into an upper storage chamber and a lower mixing chamber, and having an opening therethrough;

fluid intake and discharge ports in said mixing chamber, said intake port communicating through adjustable valve means with a source of fluid under pressure;

an elongated plunger adapted for free reciprocating motion within said cylinder, said plunger extending slidably through said openings in the upper end of said cylinder and said piston, and being in fluid tight relationship with said openings;

means associated with said plunger limiting the travel of said plunger through said piston between spaced upper and lower positions;

a fluid passage in said plunger, said passage originating at its upper and at a first port, through the side of said plunger intermediate said travel limiting means and terminating at its lower end in a second port through the lower end of said plunger, said first port being positioned to be above said piston when the plunger is in its said upper position and below said piston when the plunger is in its said lower position, and being provided with adjustable valve means for controlling the rate of flow of fluid from the storage chamber to the mixing chamber;

resilient means continuously urging said plunger toward its said lower position;

check valve means for admitting air into said storage chamber when the pressure therein falls below atmospheric pressure; and stop means adapted to halt the downward motion of said piston before the lower end of said plunger comes in contact with the bottom of said cylinder.

9. A fluid dispenser comprising:

a closed fluid tight cylinder, having an opening through its upper end;

a piston adapted for free reciprocating motion within said cylinder, said piston effectively dividing said cylinder into an upper storage chamber and a lower mixing chamber, and having an opening therethrough;

fluid intake and discharge ports in said mixing chamber, said intake port communicating through adjustable valve means with a source of fluid under pressure;

an elongated plunged adapted for free reciprocating motion within said cylinder, said plunger extending slidably through said openings in the upper end of said cylinder and said piston, and being in fluid tight relationship with said openings;

means associated with said plunger limiting the travel of said plunger through said piston between spaced upper and lower positions;

a fluid passage in said plunger, said passage being adapted to communicate between said storage chamber and said mixing chamber when the plunger is in its said upper position but not when the plunger is in its said lower position, and being provided with adjustable valve means for controlling the rate of flow of fluid from the storage chamber to the mixing chamber;

resilient means continuously urging said plunger toward its said lower position;

check valve means for admitting air into said storage chamber when the pressure therein falls below atmospheric pressure; and stop means adapted to halt the downward motion of said piston before the lower end of said plunger comes in contact with the bottom of said cylinder.

References Cited

UNITED STATES PATENTS

| 1,430,348 | 9/1922 | Arness | 137—564.5 |
| 2,830,564 | 4/1958 | Bryant | 137—625.11 |
| 3,027,094 | 3/1962 | Phillips | 239—66 |

FOREIGN PATENTS

| 648,019 | 9/1962 | Canada. | |

M. CARY NELSON, *Primary Examiner.*

W. R. CLINE, *Assistant Examiner.*